United States Patent
Kataoka et al.

(10) Patent No.: US 8,348,204 B2
(45) Date of Patent: Jan. 8, 2013

(54) CABLE GUIDE UNIT WATER-PROOF DEVICE FOR RAILWAY VEHICLE

(75) Inventors: Shin Kataoka, Kobe (JP); Kunihiko Takagi, Akashi (JP); Yutaka Kitagawa, Kobe (JP); Kazuya Morita, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 170 days.

(21) Appl. No.: 13/030,825

(22) Filed: Feb. 18, 2011

(65) Prior Publication Data

US 2011/0253847 A1 Oct. 20, 2011

(30) Foreign Application Priority Data

Feb. 22, 2010 (JP) ................................. 2010-035629

(51) Int. Cl.
*F16L 3/22* (2006.01)
*H01B 7/00* (2006.01)
(52) U.S. Cl. ........................ 248/68.1; 248/74.4; 174/135
(58) Field of Classification Search .................. 248/68.1, 248/65, 74.4; 174/135
See application file for complete search history.

(56) References Cited

U.S. PATENT DOCUMENTS

| | | | | | |
|---|---|---|---|---|---|
| 2,227,528 A | * | 1/1941 | Adler | .............................. | 174/135 |
| 2,354,919 A | * | 8/1944 | Lockwood | .................... | 248/68.1 |
| 2,361,943 A | * | 11/1944 | Issoglio et al. | ................. | 174/135 |
| 2,362,124 A | * | 11/1944 | Ellinwood | ..................... | 174/135 |
| 2,404,531 A | * | 7/1946 | Robertson | ..................... | 248/68.1 |
| 2,417,260 A | * | 3/1947 | Morehouse | .................... | 174/135 |
| 3,696,920 A | * | 10/1972 | Lahay | ........................... | 206/370 |
| 6,193,195 B1 | * | 2/2001 | Owens | .......................... | 248/68.1 |
| 2004/0124320 A1 | * | 7/2004 | Vantouroux | ................. | 248/68.1 |

FOREIGN PATENT DOCUMENTS

| | | |
|---|---|---|
| JP | Y2-58-21297 | 5/1983 |
| JP | U-62-84982 | 5/1987 |
| JP | A-2002-238142 | 8/2002 |

* cited by examiner

*Primary Examiner* — Anita M King
(74) *Attorney, Agent, or Firm* — Oliff & Berridge, PLC

(57) ABSTRACT

A waterproof cable guide device for a railway vehicle comprises an elastic member having a plurality of through-holes penetrating in a forward and backward direction and screw insertion holes penetrating in the forward and backward direction, the plurality of electric cables being inserted into the plurality of holes, respectively, the elastic member being divided in positions of the through-holes or having slits extending from an outer peripheral surface of the elastic member to the through-holes, respectively; a press casing surrounding a front surface and an outer peripheral surface of the elastic member so as not to cover the through-holes and provided with screw insertion holes communicating with the screw insertion holes of the elastic member; and screws inserted into the screw insertion holes, in a direction from forward, and tightened with respect to the cable guide; the screws being inserted into the screw insertion holes in the direction from forward and tightened with respect to the cable guide in a state where the electric cables are inserted into the through-holes, respectively, to cause the elastic member to be compressed by the press casing to closely contact peripheral surfaces of the electric cables.

3 Claims, 6 Drawing Sheets

CABLE GUIDE UNIT WATER-PROOF DEVICE FOR RAILWAY VEHICLE

CROSS-REFERENCE TO RELATED APPLICATION

This application claims priority to and the benefit of Japanese Patent Application No. 2010-035629 filed on Feb. 22, 2010, the entire disclosure of which is incorporated herein by reference.

BACKGROUND OF THE INVENTION

1. Field of the Invention

The present invention relates to a waterproof cable guide device mounted to a cable guide for a railway vehicle, which is provided with an introduction port through which a plurality of electric cables are guided into an electric device.

2. Description of the Related Art

Cable guides for a plurality of electric cables to an electric device, and device storage boxes storing the electric device are mounted mainly underfloor of a railcar. The cable guides and the device storage boxes are each provided with a cable guides having an introduction port through which electric cables are inserted from outside to inside. The cable guides and the device storage boxes protect the electric cables to prevent water ingress into inside thereof. If a waterproof performance between the introduction port and the electric cables is insufficient, then water ingress from outside would occur.

In a conventional example, the plurality of electric cables are retained by upper and lower hard resin cable retaining members in locations spaced apart from each other, the cable retaining members are fastened by bolts penetrating vertically, and putty is coated to fill a gap between a hole of each cable retaining member and the corresponding electric cable. However, putty coating requires a high skill. If an worker is not skillful, the waterproof performance becomes insufficient and the water ingress would occur. Once the cable retaining members are disassembled to draw out the electric cables, old putty must be removed and then new putty must be coated when the cable retaining members are assembled again.

Japanese Unexamined Utility Model Application Publication No. Sho. 58-21297 discloses another conventional example of a waterproof cable guide device having a structure, in which a plurality of electric cables are inserted into rubber-made tubular bushings, respectively, the tubular bushings are retained by upper and lower hard resin cable retaining members, and the cable retaining members are tightly fastened by bolts or the like. In this waterproof cable guide device, the waterproof performance is effectively attained regardless of whether or not the worker is skillful. In addition, after disassembling the waterproof cable guide device, the same components can be used to be re-assembled.

However, in this waterproof cable guide device, it is necessary to insert each of the plurality of electric cables into the corresponding tubular bushing. For example, if terminals and the like are attached to the end portions of the electric cables, the electric cables must be inserted into the bushings, respectively, after the terminals and the like are removed. Such an operation is burdensome. Furthermore, since several kinds of devices are mounted underfloor of the railcar, a space in which a worker works is limited, in many cases. In particular, when an operation for tightening bolts with a tool is performed, a space in a direction perpendicular to an axial direction of the bolts, which is required to tighten the bolts with the tool, is insufficient in some cases.

SUMMARY OF THE INVENTION

A waterproof cable guide device for railcars, of the present invention, which is mounted to a cable guide of a railcar which is provided with an introduction port through which a plurality of electric cables are guided into an electric device, comprises an elastic member having a plurality of through-holes penetrating in a forward and backward direction and screw insertion holes penetrating in the forward and backward direction, the plurality of electric cables being inserted into the plurality of through-holes, respectively, the elastic member being divided in positions of the through-holes or having slits extending from an outer peripheral surface of the elastic member to the through-holes, respectively; a press casing surrounding a front surface and an outer peripheral surface of the elastic member so as not to cover the through-holes and provided with screw insertion holes communicating with the screw insertion holes of the elastic member, respectively; and screws inserted into the screw insertion holes of the elastic member and the screw insertion holes of the press casing, in a direction from forward, and tightened with respect to the cable guide; the screws being inserted into the screw insertion holes in the direction from forward and tightened with respect to the cable guide in a state where the electric cables are inserted into the through-holes, respectively, to cause the elastic member to be compressed by the press casing to closely contact peripheral surfaces of the electric cables.

In accordance with the above configuration, by inserting the screws into the screw insertion holes and tightening them with respect to the cable guide in a state where the electric cables are inserted into the through-holes of the elastic member and the press casing cover the elastic member, the elastic member is compressed and closely contacts the electric cables. This makes it possible to surely and easily prevent ingress of water and dust into the electric device. The plurality of electric cables are inserted into the plurality of through-holes of the elastic member, respectively in such a manner that intermediate portions of the electric cables are brought into the through-holes through a space between divided components of the elastic member or the slits formed in the elastic member without inserting the end portions of the electric cables into the through-holes and moving the electric cables in an axial direction thereof. Thus, the work becomes easier. A worker has only to tighten the screws by using a screw driver or the like in a direction from forward (from one direction) to compress the elastic member by the press casings. This advantageously reduces a space in which the worker works. In addition, since it is not necessary to increase a distance between the through-holes of the elastic member, a space occupied by the waterproof cable guide device can be lessened, and size and weight of the waterproof cable guide device can be reduced. After assembling, the waterproof cable guide device can be disassembled by removing the screws and thereafter can be assembled again. Thus, the waterproof cable guide device can be used in repetition.

DETAILED DESCRIPTION OF THE PREFERRED EMBODIMENTS

Hereinafter, an embodiment of the present invention will be described with reference to the drawings.

Figure 1:
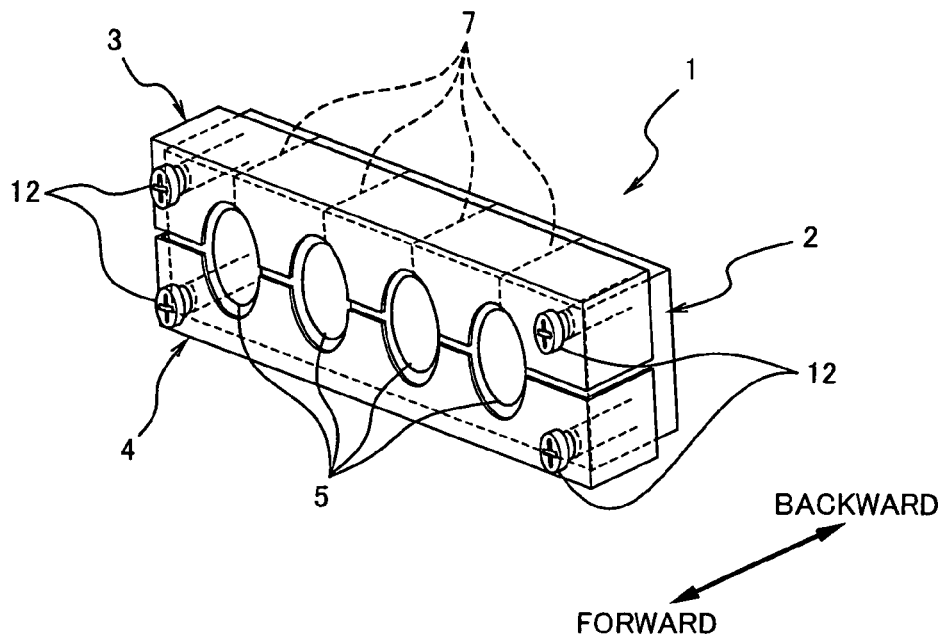
FIG. 1 is a perspective view showing a waterproof cable guide device according to an embodiment of the present invention.
Figure 2:
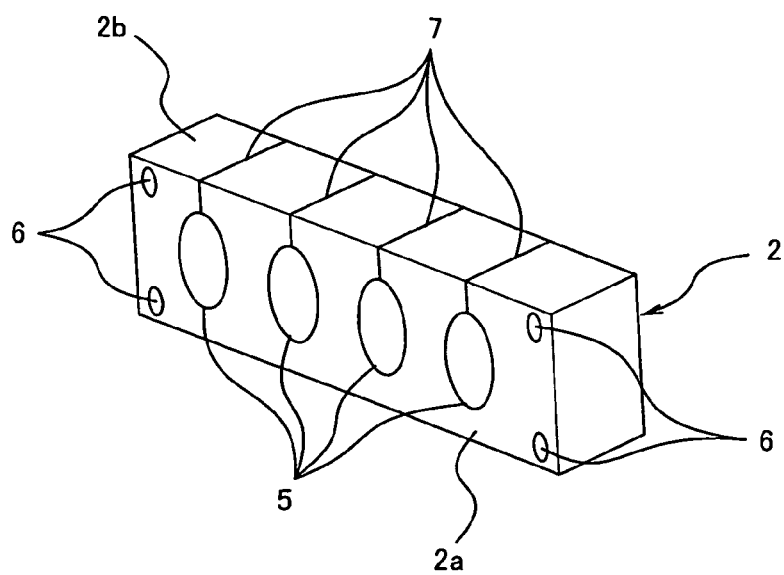
FIG. 2 is a perspective view of an elastic member of FIG. 1.
Figure 3:
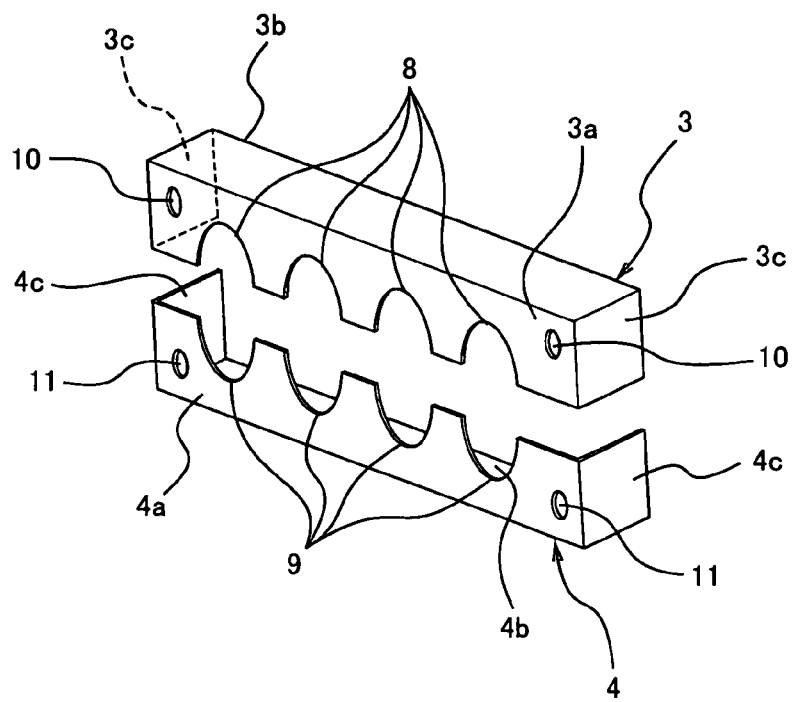
FIG. 3 is a perspective view of press casings of FIG. 1.

FIG. 1 is a perspective view showing a waterproof cable guide device 1 according to an embodiment of the present invention. FIG. 2 is a perspective view of an elastic member 2 of FIG. 1. FIG. 3 is a perspective view of press casings 3 and 4 of FIG. 1. As shown in FIGS. 1 to 3, the waterproof cable guide device 1 of this embodiment is mounted to a cable guide 22 (see FIG. 5A) for a railcar which is provided with introduction ports 24 (see FIG. 5A) for guiding a plurality of electric cables 30 (see FIG. 5A) to an electric device. The waterproof cable guide device 1 includes the elastic member 2 made of a natural rubber or a synthetic rubber such as a chloroprene rubber, a pair of upper and lower press casings 3 and 4 made of metal, hard resin, or the like, and a plurality of screws 12 for tightly fastening the elastic member 2 and the press casings 3 and 4 to the cable guide 22 (see FIG. 5A).

As shown in FIGS. 1 and 2, the elastic member 2 has a substantially rectangular prism shape which is elongate in a lateral direction, and has a front surface 2a, a rear surface 2c (see FIG. 5A) and an outer peripheral surface 2b including upper and lower surfaces and both side surfaces. The elastic member 2 is provided with a plurality of through-holes 5 into which the plurality of electric cables 30 (see FIG. 5A) are inserted, respectively. The through-holes 5 penetrate in a forward and backward direction and have cross-sections of a perfect-circle shape. In this embodiment, in the elastic member 2, the four through-holes 5 are aligned at equal intervals in the lateral direction. The elastic member 2 is provided with a plurality of slits 7 extending from an upper surface of an outer peripheral surface 2b thereof to the through-holes 5, respectively. The slits 7 vertically extend substantially in parallel in a straight-line shape. The elastic member 2 has at four corner portions thereof, screw insertion holes 6 penetrating in a forward and backward direction from the front surface 2a toward the rear surface 2c.

Figure 4:
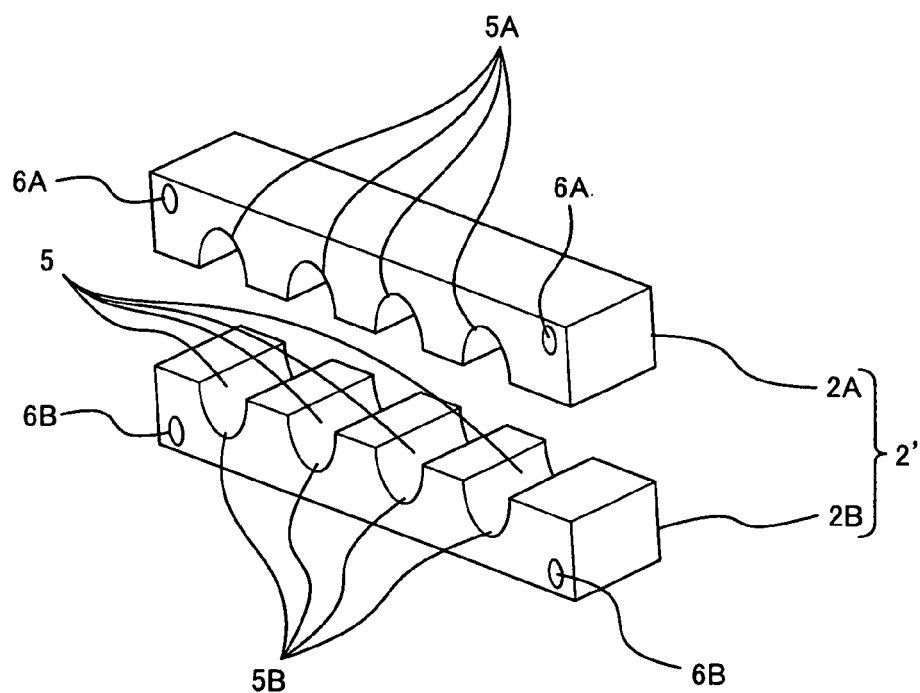
FIG. 4 is a perspective view of a modification example of the elastic member.

As shown in FIG. 4, an elastic member 2' may be composed of an upper elastic member 2A and a lower elastic member 2B which are upper and lower components into which the elastic member 2' is divided at vertical center positions of through-holes 5, and are vertically symmetric in shape. To be specific, the upper elastic member 2A has on a lower surface thereof grooves 5A having semi-circular cross-sections and being recessed in an upward direction, while the lower elastic member 2B has on an upper surface thereof grooves 5B having semi-circular cross-sections and being recessed in a downward direction. The grooves 5A and the grooves 5B are joined together, thereby forming the through-holes 5. The upper elastic member 2A is provided at right and left sides with screw insertion holes 6A penetrating from a front surface thereof to a rear surface thereof, while the lower elastic member 2B is provided at right and left sides with screw insertion holes 6B penetrating from a front surface thereof to a rear surface thereof.

As shown in FIGS. 1 and 3, the press casings 3 and 4 are vertically symmetric. The upper casing 3 has a front wall 3a, an upper wall 3b, and right and left side walls 3c, and opens at its lower side and at its rear side. The front wall 3a has four concave portions 8 which are formed by cutting out a lower end thereof in an upward direction in a semi-circular shape and are arranged at equal intervals in the lateral direction. The front wall 3a is provided at right and left sides with screw insertion holes 10 communicating with the corresponding screw insertion holes 6 of the elastic member 2, respectively. The lower press casing 4 has a front wall 4a, a lower wall 4b and right and left side walls 4c and opens at its upper side and at its rear side. The front wall 4a has four concave portions 9 which are formed by cutting out an upper end thereof in a downward direction in a semi-circular shape and are arranged at equal intervals in the lateral direction. The front wall 4a is provided at right and left sides with screw insertion holes 11 communicating with the corresponding screw insertion holes 6 of the elastic member 2, respectively.

The press casings 3 and 4 are caused to cover the elastic member 2 to surround the front surface 2a and the outer peripheral surface 2b of the elastic member 2, and the screw insertion holes 10 and 11 of the press casings 3 and 4 are aligned with the corresponding screw insertion holes 6 of the elastic member 2, respectively. In this state, the concave portions 8 of the press casing 3 face the corresponding concave portions 9 of the press casing 4, respectively, thereby forming openings of a substantially circle shape for exposing the through-holes 5 of the elastic member 2. The openings are set larger in size than the through-holes 5 of the elastic member 2. In a state where the elastic member 2 is uncompressed before tightening the screws 12, the upper wall 3b and the right and left side walls 3c of the press casing 3, and the lower wall 4b and the right and left side walls 4c of the press casing 4 are in contact with or slightly apart from the outer peripheral surface 2b of the elastic member 2. In a state where the elastic member 2 is uncompressed, the elastic member 2 protrudes in a backward direction relative to the press casings 3 and 4, in a state where the elastic member 2 is in contact with the front wall 3a of the press casing 3 and the front wall 4a of the press casing 4.

Figure 5A:
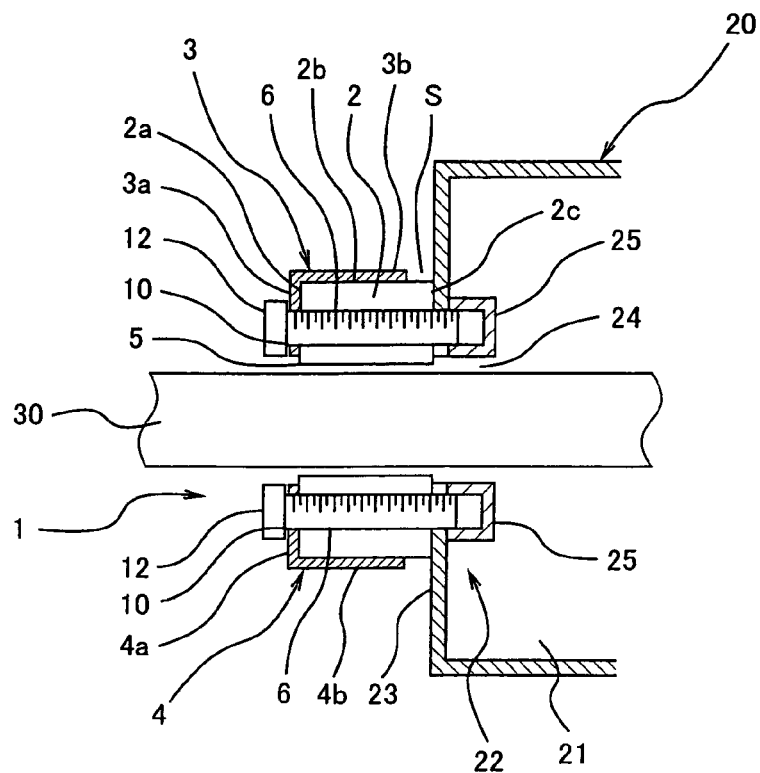
FIG. 5A is a partial cross-sectional view showing a state where the waterproof cable guide device of FIG. 1 is mounted to an electric device storage box.
Figure 5B:
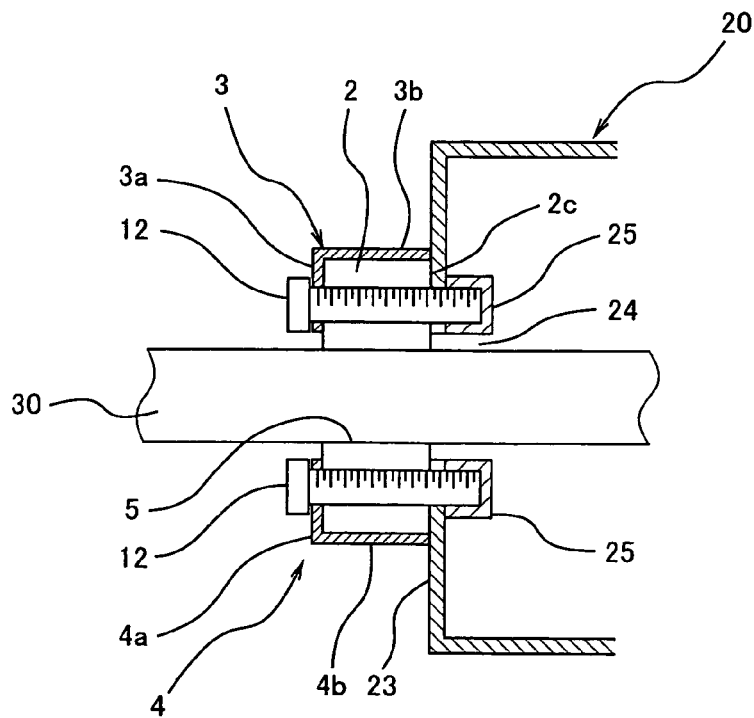
FIG. 5B is a partial cross-sectional view showing a state where mounting of the waterproof cable guide device to the electric device storage box is accomplished.
Figure 6:
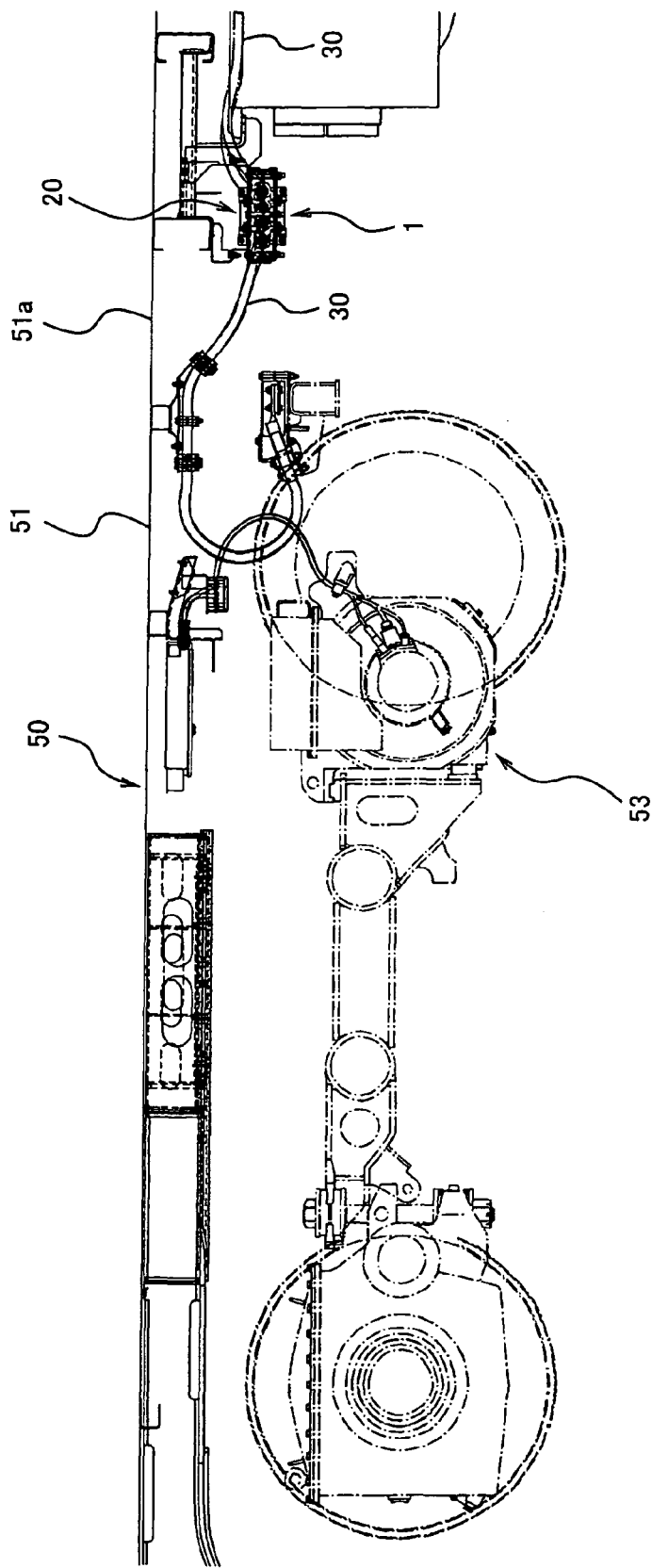
FIG. 6 is a side view of major components of a railcar attached with the waterproof cable guide device of FIG. 1.
Figure 7:
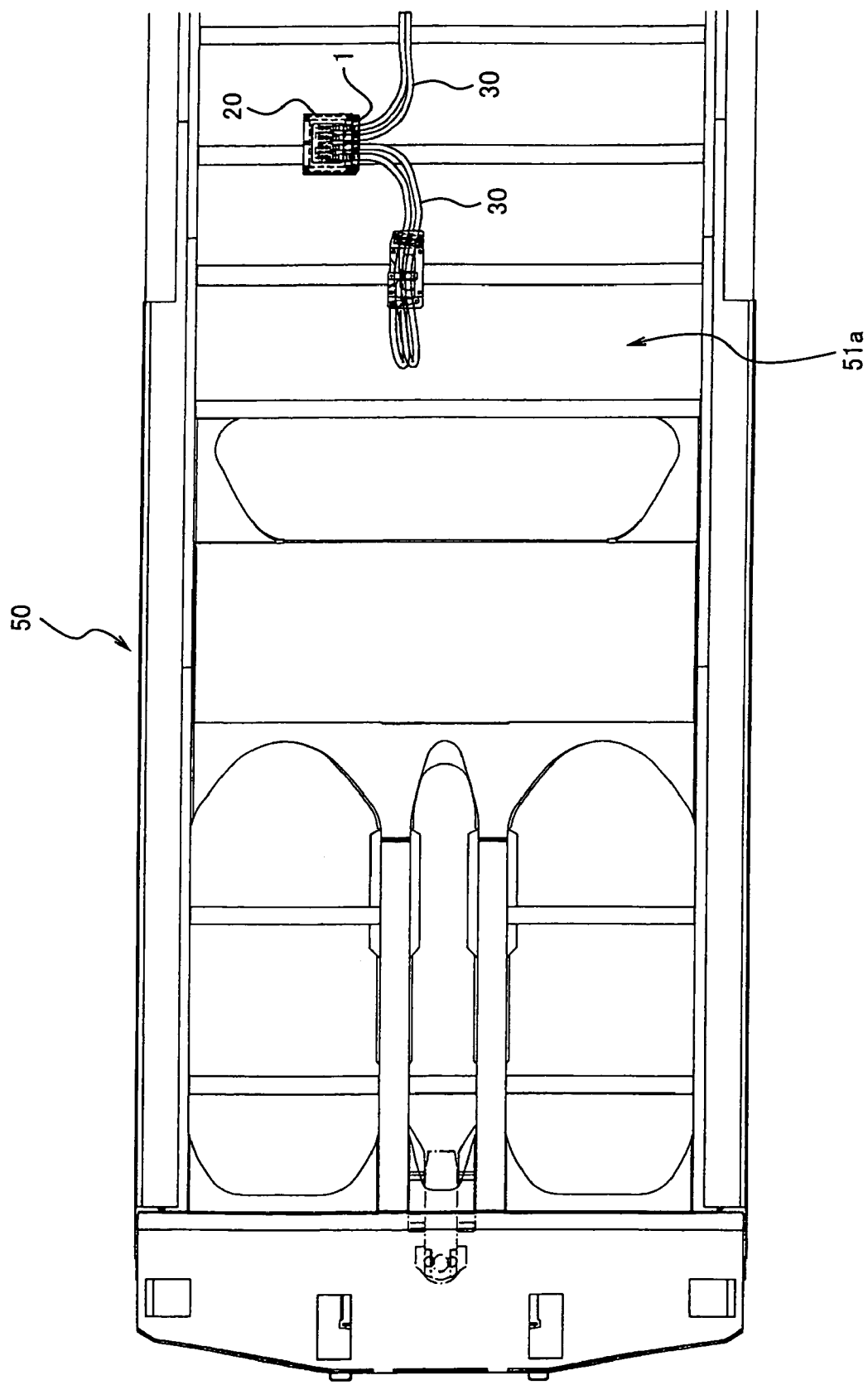
FIG. 7 is a bottom view of the railcar of FIG. 6.

FIG. 5A is a partial cross-sectional view showing a state where the waterproof cable guide device 1 of FIG. 1 is mounted to the electric device storage box 20, and FIG. 5B is a partial cross-sectional view showing a state where mounting of the waterproof cable guide device 1 to the electric device storage box 20 is accomplished. FIG. 6 is a side view of major components of a railcar 50 attached with the waterproof cable guide device 1 of FIG. 1. FIG. 7 is a bottom view of the railcar 50 of FIG. 6. As shown in FIGS. 6 and 7, the electric device storage box 20 of the railcar 50 is fastened to a lower surface of a floor 51a of a carbody 51 in the vicinity of a truck 53, and the electric device (not shown) is accommodated into an inner space 21 (see FIG. 5A) of the electric device storage box 20. As shown in FIG. 5A, the cable guide 22 of the electric device storage box 20 is provided on a front surface 23 thereof with the introduction ports 24 through which the plurality of electric devices 30 are guided to the electric device (not shown). The cable guide 22 is provided with screw holes 25 communicating with the screw insertion holes 6, 10, and 11 of the waterproof cable guide device 1, in the vicinity of the introduction ports 24 of the cable guide 22.

Next, an operation for mounting the waterproof cable guide device 1 will be described. As shown in FIG. 5A, initially, in the cable guide 22 of the electric device storage box 20, the four electric cables 30 are drawn into the inner space 21 through the introductions ports 24 such that the four electric cables 30 are spaced apart from each other. In this state, the four electric cables 30 are inserted into the through-holes 5 through the slits 7 formed in the elastic member 2, respectively. Then, the press casings 3 and 4 are caused to cover the elastic member 2 in such a way that the concave portions 8 and 9 surround the four electric cables 30, and the screw insertion holes 10 and 11 of the press casings 3 and 4 communicate with the screw insertion holes 6 of the elastic member 2. In this state, the screws 12 are inserted into the screw insertion holes 6, 10, and 11 in a direction from forward, and are threadingly engaged with the screw holes 25 of the cable guide 22. In a state shown in FIG. 5A, the front wall 3a of the press casing 3 and the front wall 4a of the press casing 4 are in contact with the front surface 2a of the elastic member 2, and a rear surface 2c of the elastic member 2 is in contact with the front surface 23 of the cable guide 22, but the upper wall 3b of the press casing 3 and the right and left side walls 3c of the press casing 3, and the lower wall 4b of the press casing 4 and the right and left side walls 4c of the press casing 4 are apart from the front surface 23 of the cable guide 22 with a gap S between them and are not in contact with the front surface 23 of the cable guide 22.

Then, as shown in FIG. 5B, a plus screw driver or a minus screw driver (not shown) tightens the screws 12 with respect to the cable guide 22, thereby allowing the press casings 3 and 4 to contact the front surface 23 of the cable guide 22, and the elastic member 2 to be sandwiched between the front walls 3a of the press casing 3, the front wall 4a of the press casing 4, and the front surface 23 of the cable guide 22, and compressed in the forward and backward direction (thickness direction). In this case, the front wall 3a, the upper wall 3b, and the right and left side walls 3c of the press casing 3, and the front wall 4a, the upper wall 4b, and the right and left side walls 4c of the press casing 4 inhibit the elastic member 2 from expanding in a direction (vertical direction and rightward and leftward direction) perpendicular to an axial direction (forward and backward direction) of the screw insertion hole 6. Therefore, by tightening the screws 12, the elastic member 2 is deformed in such a way that the through-holes 5 reduce their diameters, and the elastic member 2 surely closely contacts the outer peripheral surfaces of the electric cables 30. In other words, by merely tightening the screws 12, three works are accomplished simultaneously, i.e., the waterproof cable guide device 1 can be fastened to the electric device storage box 20, the elastic member 2 can be compressed in the thickness direction to closely contact the front surface 23 of the cable guide 22, and the elastic member 2 can be compressed in the vertical direction and in the rightward and leftward direction to closely contact the electric cables 30.

In accordance with the above configuration, by merely inserting the screws 12 into the screw insertion holes 6, 10 and 11 and tightening them with respect to the cable guide 22 in a state where the electric cables 30 are inserted into the through-holes 5 of the elastic member 2 and the press casings 3 and 4 cover the elastic member 2, the elastic member 2 is compressed and closely contacts the electric cables 30. This makes it possible to surely and easily prevent ingress of water and dust into the electric device. The plurality of electric cables 30 are inserted into the plurality of through-holes 5 of the elastic member 2, respectively in such a manner that intermediate portions of the electric cables 30 are brought into the through-holes 5 through the slits 7 formed in the elastic member 2 without inserting the end portions of the electric cables 30 into the through-holes 5 and moving the electric cables 30 in an axial direction thereof. Thus, the work becomes easier. A worker has only to tighten the screws 12 by using the screw driver or the like in a direction from forward to compress the elastic member 2 by the press casings 3 and 4. This advantageously reduces a space in which the worker works. In addition, since it is not necessary to increase a distance between the through-holes 5 of the elastic member 2, a space occupied by the waterproof cable guide device 1 can be lessened, and size and weight of the waterproof cable guide device 1 can be reduced. After assembling, the waterproof cable guide device 1 can be disassembled by removing the screws and thereafter can be assembled again. Thus, the waterproof cable guide device 1 can be used in repetition.

Figure 8A:
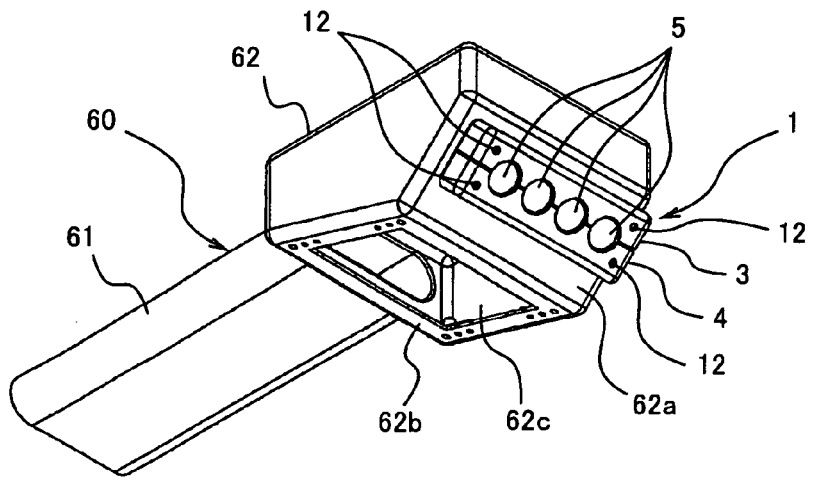
FIG. 8A is a perspective view showing an example in which the waterproof cable guide device of FIG. 1 is mounted to a cable guide, when viewed from below.
Figure 8B:
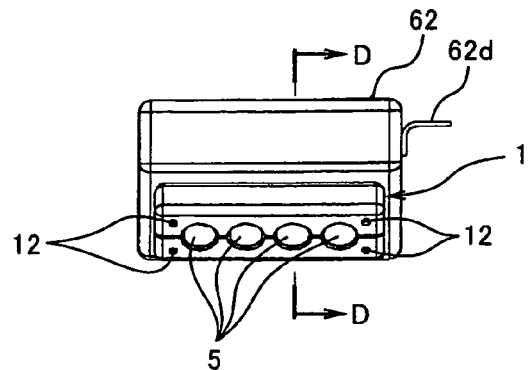
FIG. 8B is a front view thereof.
Figure 8C:
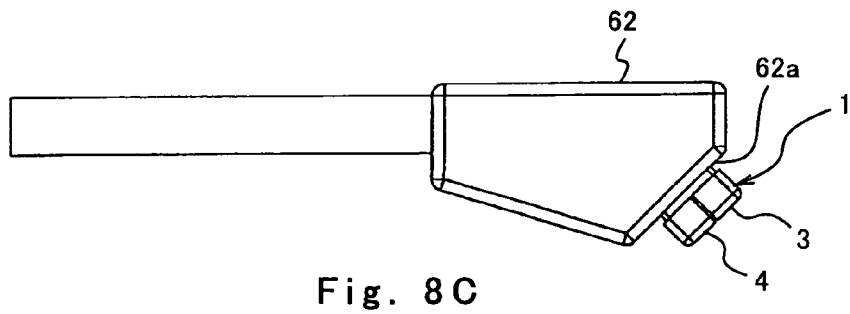
FIG. 8C is a side view thereof.
Figure 8D:
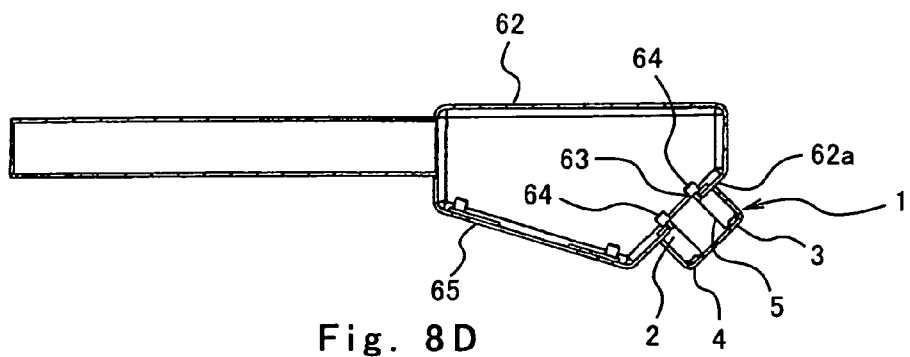
FIG. 8D is a cross-sectional view taken along line D-D of FIG. 8B.

FIG. 8A is a perspective view showing an example in which the waterproof cable guide device 1 of FIG. 1 is mounted to a cable introducing apparatus 60, when viewed from below. FIG. 8B is a front view thereof. FIG. 8C is a side view thereof. FIG. 8D is a cross-sectional view taken along line D-D of FIG. 8B. As shown in FIGS. 8A to 8D, the waterproof cable guide device 1 of FIG. 1 may be mounted to a cable guide 62 of the cable introducing apparatus 60, instead of the electric device storage box 20. The cable introducing apparatus 60 for a railcar is disposed in front of an electric device storage box or the like to guide the plurality of electric cables 30 to an electric device (not shown) within the electric device storage box. The cable introducing apparatus 60 includes a tubular guide body 61 having a cross-section of a substantially elongate shape and provided with a guide passage inside thereof, and a cable guide 62 of a box shape which is provided at a tip end side of the guide body 61 and communicates with the guide passage.

The cable guide 62 has a front surface 62a (guide surface) tilted in a slightly downward direction. Four introduction ports 63 are aligned on the front surface 62a in the lateral direction. The cable guide 62 has an opening 62c on a bottom surface 62b to facilitate introducing of the cables. A bottom plate 65 is removably attached to the bottom surface 62b to close the opening 62c. A mounting member 62d protrudes at one side of the cable guide 62 and is fastened to a lower surface of the floor of the car body. Screw holes 64 are provided at four corners of the front surface 62a of the cable guide unit 62, and the screws 12 are threadingly engageable into the screw holes 64, respectively to fasten the waterproof cable guide device 1.

Although in the above embodiment, the press casings 3 and 4 are two components, i.e., upper and lower components, they may be three or more components, or otherwise may be a unitary component. The number of the through-holes 5 provided in the elastic member 2 is determined according to the number of the electric cables 30, and is not limited to four.

What is claimed is:
1. A waterproof cable guide device for a railway vehicle, which is mounted to a cable guide of railcars which is provided with an introduction port through which a plurality of electric cables are guided to an electric device, the waterproof cable guide device comprising:
an elastic member having a plurality of through-holes penetrating in a forward and backward direction and screw insertion holes penetrating in the forward and backward direction, the plurality of electric cables being inserted into the plurality of through-holes, respectively, the elastic member being divided in positions of the through- holes or having slits extending from an outer peripheral surface of the elastic member to the through-holes, respectively;

a press casing surrounding a front surface and an outer peripheral surface of the elastic member so as not to cover the through-holes and provided with screw insertion holes communicating with the screw insertion holes of the elastic member, respectively; and screws inserted into the screw insertion holes of the elastic member and the screw insertion holes of the press casing, in a direction from forward, and tightened with respect to the cable guide;

the screws being inserted into the screw insertion holes in the direction from forward and tightened with respect to the cable guide in a state where the electric cables are inserted into the through-holes, respectively, to cause the elastic member to be compressed by the press casing to closely contact peripheral surfaces of the electric cables.

2. The waterproof cable guide device for the railway vehicle, according to claim 1, wherein the press casing inhibits the elastic member from expanding in a direction perpendicular to axes of the screw holes, when the screws are tightened.

3. The waterproof cable guide device for the railway vehicle, according to claim 1, wherein the press casing is apart from the cable guide in a state where the elastic member is uncompressed, and the screws are tightened with respect to the cable guide to cause the press casing to compress the elastic member and to contact the cable guide.

* * * * *